E. Bigelow,
Soda Water App-s.
Nº 51,130.           Patented Nov. 28, 1865.
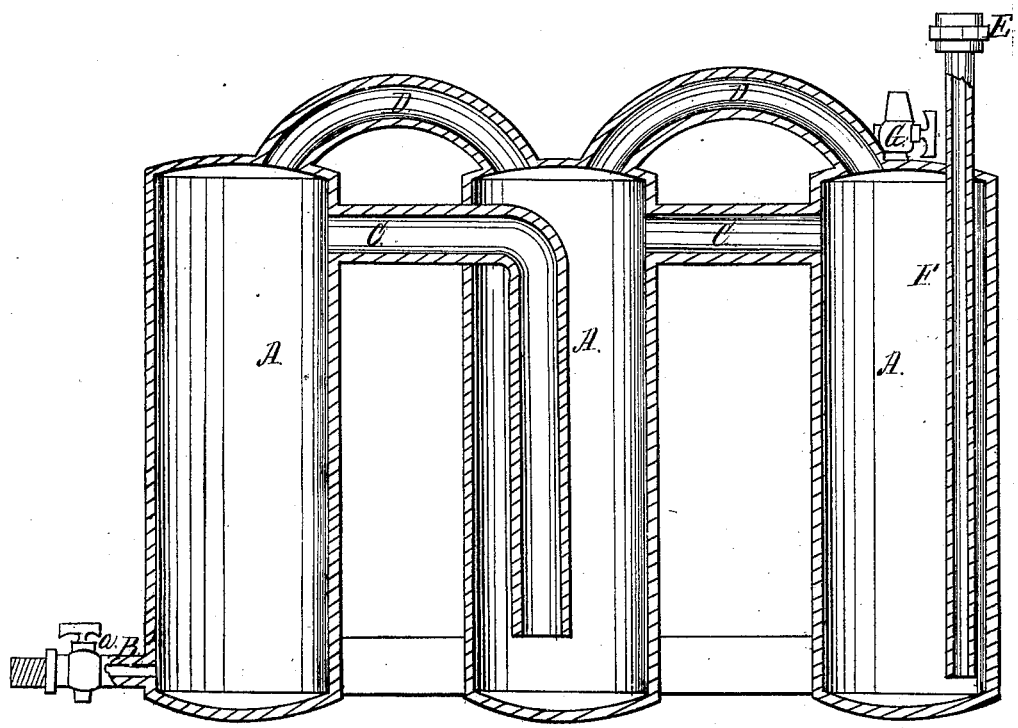
Witnesses:
Theo Tusell
C L Topbff
Inventor:
Edmund Bigelow
Jam Munn & Co
Attorneys.

UNITED STATES PATENT OFFICE.

EDMUND BIGELOW, OF SPRINGFIELD, MASSACHUSETTS.

IMPROVED APPARATUS FOR COOLING SODA-WATER, &c.

Specification forming part of Letters Patent No. 51,130, dated November 28, 1865.

*To all whom it may concern:*

Be it known that I, EDMUND BIGELOW, of Springfield, in the county of Hampden and State of Massachusetts, have invented a new and Improved Apparatus for Cooling Soda-Water; and I do hereby declare that the following is a full, clear, and exact description thereof, which will enable those skilled in the art to make and use the same, reference being had to the accompanying drawing, forming part of this specification.

The drawing represents a side sectional view of my invention.

For many years the cooling of soda-water has been produced by running the same through coils of pipe packed in ice, and from the coils, if not directly to the soda-water draft-tube, to a drum or minor reservoir, and thence to the draft-tube. The great object sought for has been to get a large cooling-surface and capacity for the cold soda before being drawn. In a coil of pipe a large cooling-surface is obtained, but little capacity. A drum has, in some instances, been added, and this partially overcomes the difficulty when the demand is not large or many glasses not drawn rapidly in succession. During a heated term, when the demand is rapid, this cooling process fails, as the soda in the fountain, being nearly of the temperature of the air, passes so rapidly and directly through the coil to the draft tube or drum that the full effect of the ice is not obtained, as, for instance, if the coil holds but two glasses of soda and the drum eight glasses, and six glasses are drawn in rapid succession, the drum will be filled up with two glasses from the coil and four glasses which have run direct from the fountain to the drum, and if six more glasses be drawn the cooling power of the coil and drum will be nearly neutralized.

My invention, it is believed, fully obviates this difficulty; and it is constructed of a series of upright vessels, A, of cylindrical or other form, with one of which, at its lower part, the supply-pipe B from the fountain communicates, said vessels being connected near their upper parts by tubes C, which are as near the tops of the vessels as it is practicable to place or adjust them.

The vessels A are connected at their tops by tubes D, which form air-passages from one vessel to the other.

E is a coupling, which connects a vertical tube, F, in the end vessel, A, with the draft-soda tube, and G is a cock in the top of the same vessel for letting off condensed air and gas. The tube F extends down nearly to the bottom of the vessel in which it is placed, and all the vessels are within a suitable ice-chamber.

The operation is as follows: By attaching the soda-fountain to pipe B and opening the cock $a$ in said pipe, the first vessel, A, immediately fills up to outlet-tube C, the second vessel and third vessel are also filled consecutively, and so on until all are full. The cock G is opened to admit of the escape of air and gas, so that the last vessel may be completely filled. A glass of soda drawn from the third or last vessel is replaced from that in the second one, which, in turn, is supplied from the first vessel. If the third vessel holds six glasses of soda-water the whole may be drawn, reducing the temperature only by that which has passed through the first and second vessels. When the fountain is exhausted of soda the gas-pressure passes through the first and second vessels and forces the soda out at the draft-pipe until the third vessel is empty. By turning cock $a$, the first and second vessels being full, the fountain can be detached and a full one applied, and cold soda drawn at once, instead of drawing direct from a fresh and warm fountain, as is now the case.

I claim as new and desire to secure by Letters Patent—

The vertical cooling-vessels A A A, connected by pipes C C near their upper ends, and by air-pipes D D at top, in the described combination with the supply-cock B, escape-cock G, and the draft-tube E, extending nearly to the bottom of one of the cooling-vessels, the whole being arranged substantially as herein described, so as to operate in the manner set forth.

EDMUND BIGELOW.

Witnesses:
FRED. L. HOWLAND,
GOUVERNEUR KENT.